(12) United States Patent
Putman et al.

(10) Patent No.: US 10,911,303 B2
(45) Date of Patent: Feb. 2, 2021

(54) ACCESS NODE CONFIGURATION IN A NETWORK

(71) Applicant: Airspan Networks Inc., Boca Raton, FL (US)

(72) Inventors: Anthony Edward Putman, Chippenham (GB); Alan Carter, Bath (GB); Robert John Hunter, Wiltshire (GB)

(73) Assignee: AIRSPAN NETWORKS INC., Boca Raton, FL (US)

( * ) Notice: Subject to any disclaimer, the term of this patent is extended or adjusted under 35 U.S.C. 154(b) by 352 days.

(21) Appl. No.: 15/655,035

(22) Filed: Jul. 20, 2017

(65) Prior Publication Data
US 2019/0028343 A1    Jan. 24, 2019

(51) Int. Cl.
*G06F 15/16* (2006.01)
*H04L 12/24* (2006.01)
(Continued)

(52) U.S. Cl.
CPC ......... *H04L 41/0816* (2013.01); *H04L 41/08* (2013.01); *H04L 41/0886* (2013.01);
(Continued)

(58) Field of Classification Search
CPC ............. H04L 41/0816; H04L 41/0823; H04L 41/0813; H04L 41/08; H04L 41/0876;
(Continued)

(56) References Cited

U.S. PATENT DOCUMENTS 6,286,038 B1   9/2001  Reichmeyer et al.
9,191,275 B1  11/2015  Worsley
(Continued)

FOREIGN PATENT DOCUMENTS

CN  102448186 B   2/2016
EP    2627137 A1  8/2013
(Continued)

OTHER PUBLICATIONS

PCT Int'l Search Report and Written Opinion from related case PCT/GB2018/051646 dated Sep. 19, 2018, 19 pages.
(Continued)

*Primary Examiner* — Ruolei Zong
(74) *Attorney, Agent, or Firm* — Haynes Beffel & Wolfeld LLP

(57) ABSTRACT

An apparatus, method of operating the apparatus, and system comprising the apparatus are provided. The apparatus has a backhaul sub-node to provide a backhaul connection to a communications network and an access sub-node to provide an access cell to which user equipment can connect. In response to a configuration trigger a configuration procedure is performed, in which the backhaul sub-node gathers information about the network environment and transmits at least a portion of the information about the network environment to a network management node. The the network management node then generates an access sub-node configuration which it transmits to the access sub-node, where the configuration is dependent on the information about the network environment transmitted to the network management node by the backhaul sub-node. The backhaul sub-node's greater ability to gather information about the network environment thus supports an improved configuration for the access sub-node, without technical input from the user being required.

22 Claims, 7 Drawing Sheets

(51) Int. Cl.
*H04W 88/08* (2009.01)
*H04W 88/04* (2009.01)
*H04W 24/02* (2009.01)

(52) U.S. Cl.
CPC .......... *H04W 24/02* (2013.01); *H04W 88/04* (2013.01); *H04W 88/08* (2013.01); *H04L 41/0823* (2013.01); *H04L 41/0876* (2013.01)

(58) Field of Classification Search
CPC .... H04L 41/0886; H04L 43/08; H04W 88/04; H04W 88/08; H04W 24/02
USPC ........................................................ 709/221
See application file for complete search history.

(56) References Cited

U.S. PATENT DOCUMENTS

| | | | | |
|---|---|---|---|---|
| 2009/0129291 | A1* | 5/2009 | Gupta | H04W 8/26 370/254 |
| 2010/0014415 | A1* | 1/2010 | Moeller | H04W 76/18 370/216 |
| 2011/0045835 | A1 | 2/2011 | Chou et al. | |
| 2013/0013752 | A1 | 1/2013 | Herrera Van Der Nood et al. | |
| 2013/0294288 | A1* | 11/2013 | Choi | H04L 47/745 370/254 |
| 2014/0003332 | A1* | 1/2014 | Bennett | H04W 24/04 370/328 |
| 2014/0204846 | A1 | 7/2014 | Maltsev et al. | |
| 2014/0233412 | A1* | 8/2014 | Mishra | H04W 76/10 370/252 |
| 2014/0323137 | A1* | 10/2014 | Graffagnino | H04W 28/0289 455/445 |
| 2015/0006689 | A1 | 1/2015 | Szilagyi et al. | |
| 2015/0245272 | A1* | 8/2015 | Lindoff | H04W 48/06 370/332 |
| 2016/0029430 | A1* | 1/2016 | Mishra | H04W 36/30 370/254 |
| 2016/0142880 | A1* | 5/2016 | Talluri | H04W 4/025 455/456.1 |
| 2016/0381574 | A1 | 12/2016 | Dudzinski et al. | |
| 2016/0381585 | A1 | 12/2016 | Dudzinski et al. | |
| 2017/0055304 | A1 | 2/2017 | Pappa et al. | |
| 2017/0245311 | A1* | 8/2017 | Murray | H04W 12/02 |

FOREIGN PATENT DOCUMENTS

| | | |
|---|---|---|
| GB | 2539730 A | 12/2016 |
| GB | 2539731 A | 12/2016 |
| GB | 2539730 A8 | 1/2017 |
| WO | 2016028969 A1 | 2/2016 |

OTHER PUBLICATIONS

U.S. Office Action in U.S. Appl. No. 15/655,051 dated Jul. 30, 2019, 14 pages.
PCT IPRP from related case PCT/GB2018/051646 Jul. 4, 2019, 23 pages.
PCT IPRP from related case PCT/GB2018/051639 Oct. 11, 2019, 21 pages.
US Ex Parte Quayle Action in U.S. Appl. No. 15/655,051 Dec. 16, 2019, 5 pages.

* cited by examiner

ACCESS NODE CONFIGURATION IN A NETWORK

TECHNICAL FIELD

The present disclosure relates to networks. More particularly it relates to configuring a node for participating in the network, for example on deployment.

BACKGROUND

In modern communication networks, for example such as a mobile network that is used to support mobile communication, the need exists to support an ever increasing number of devices connected to the network and to improve the coverage of the network so that the connected devices are provided with a high capacity connection, regardless of their location.

The problems of providing sufficient network coverage and capacity can be particularly problematic in urban environments, where there is typically not only a high density of users, but where the urban infrastructure, such as large buildings, can significantly attenuate signals. For this reason there may be a desire to deploy more and more network nodes which support the network, but doing so also brings with it a requirement for newly deployed nodes to be well-configured, which can in itself become a significant burden, for example in terms of the number of technicians who must be employed to carry out the configuration of each newly deployed node.

SUMMARY

In one example configuration there is provided an apparatus comprising: a backhaul sub-node to provide a backhaul connection to a communications network; and an access sub-node to provide an access cell to which user equipment can connect, wherein the apparatus is responsive to a configuration trigger to perform a configuration procedure comprising: the backhaul sub-node gathering information about the network environment and transmitting at least a portion of the information about the network environment to a network management node, and the access sub-node receiving an access sub-node configuration from the network management node, wherein the configuration is dependent on the at least a portion of the information about the network environment transmitted to the network management node.

In another example configuration there is provided a method of performing a configuration procedure in an apparatus comprising: in a backhaul sub-node of the apparatus capable of providing a backhaul connection to a communications network; gathering information about the network environment; and transmitting at least a portion of the information about the network environment to a network management node; and in an access sub-node of the apparatus capable of providing an access cell to which user equipment can connect: receiving an access sub-node configuration from the network management node, wherein the configuration is dependent on the at least a portion of the information about the network environment transmitted to the network management node; and adopting the access sub-node configuration.

In a further example configuration there is provided a system comprising: the apparatus of the above-mentioned example configuration, wherein the configuration procedure comprises the backhaul sub-node providing the network management node with location information for the apparatus; the network management node; and a database, wherein the network management node is responsive to reception of the location information for the apparatus from the backhaul sub-node to retrieve parameters for the access sub-node configuration from the database in dependence on the at least a portion of the information about the network environment transmitted to the network management node.

In a further example there is provided a method of performing a configuration procedure in the system according to the above-mentioned example configuration comprising: in response to a configuration trigger, in the backhaul sub-node: gathering information about the network environment; and transmitting at least a portion of the information about the network environment to the network management node; in the network management node, in response to reception of the location information for the apparatus from the backhaul sub-node: retrieving parameters for the access sub-node configuration from the database in dependence on the at least a portion of the information about the network environment transmitted to the network management node; and transmitting the access sub-node configuration to the access sub-node; and in the access sub-node: receiving the access sub-node configuration from the network management node; and adopting the access sub-node configuration.

In a yet further example confirmation there is provided an apparatus comprising an apparatus comprising: means for providing a backhaul connection to a communications network; and means for providing an access cell to which user equipment can connect, wherein the apparatus is responsive to a configuration trigger to perform a configuration procedure comprising: the means for providing the backhaul connection gathering information about the network environment and transmitting at least a portion of the information about the network environment to a means for network management, and the means for providing the access cell receiving a configuration from the means for network management, wherein the configuration is dependent on the at least a portion of the information about the network environment transmitted to the means for network management.

BRIEF DESCRIPTION OF THE DRAWINGS

The present techniques will be described further, by way of example only, with reference to embodiments thereof as illustrated in the accompanying drawings, in which.

DESCRIPTION OF EXAMPLE EMBODIMENTS

Figure 1:
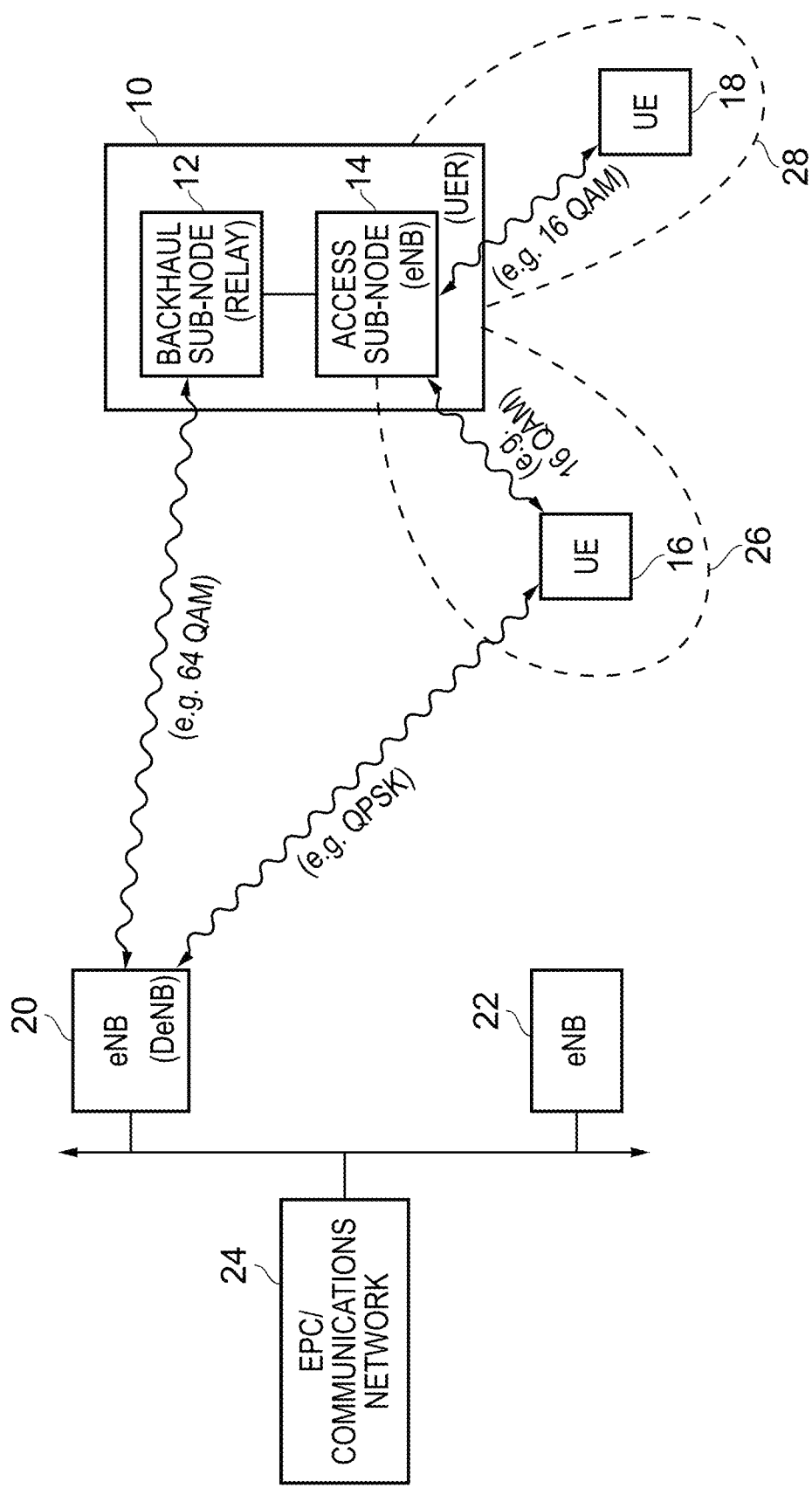
FIG. 1 is a block diagram schematically illustrating an apparatus in accordance with some embodiments, showing its connection to user equipment and to a communications network.

Before discussing embodiments with reference to the accompanying figures, the following description of embodiments is provided.

In one embodiment an apparatus is provided comprising: a backhaul sub-node to provide a backhaul connection to a communications network; and an access sub-node to provide an access cell to which user equipment can connect, wherein the apparatus is responsive to a configuration trigger to perform a configuration procedure comprising: the backhaul sub-node gathering information about the network environment and transmitting at least a portion of the information about the network environment to a network management node, and the access sub-node receiving an access sub-node configuration from the network management node, wherein the configuration is dependent on the at least a portion of the information about the network environment transmitted to the network management node.

Accordingly, the apparatus is essentially formed of two parts, namely the backhaul sub-node and the access sub-node, where each performs a different function. The access sub-node is provided to allow user equipment to connect to the apparatus and more specifically for that connection to be forwarded, by means of the backhaul connection provided by the backhaul sub-node, to the communications network. As such, the communications capabilities of the two sub-nodes also differs, because of the respective communication links which they are arranged to provide. On the one hand, where the access sub-node is provided to support communication links to local user equipment, this also means that, on its own, the access sub-node has a limited ability to determine the network environment in which it has been deployed so that its configuration can be selected such that it will indeed enhance the network coverage making best use of the access sub-node's capability. However, on the other hand, where the backhaul sub-node is capable of connecting to the communications network, the backhaul sub-node is better able to determine and/or access additional information about the network environment in which the apparatus has been deployed. Recognising this, the apparatus provided will respond to a configuration trigger (which could take a variety of forms, but may for example form part of a start-up procedure in a new deployment of the apparatus) to perform a configuration procedure. This configuration procedure comprises the backhaul sub-node gathering information about the network environment and transmitting at least a portion of this information to a network management node (which itself forms a node in the network). This information about the network environment may take a variety of forms, but in general provides information relating to the situation in which the apparatus has been deployed and this allows the network management node to adapt the configuration which it provides for the access sub-node in order to allow the access sub-node to operate well in its new deployment.

As mentioned above, the information about the network environment may take a variety of forms, and in some embodiments the configuration procedure comprises the backhaul sub-node providing the network management node with location information for the apparatus. Accurate knowledge of where the apparatus has been deployed is a significant factor in the configuration of the apparatus, and specifically in the present context the configuration of the access sub-node. Not only does accurate location information indicate precisely where the apparatus has been deployed, but can enable the network management node to determine where the newly deployed apparatus is with respect to existing deployed nodes in the network (for example with reference to a deployment database) and this further enhances the ability of the network management node to provide the access sub-node with a configuration which allows it to operate with high efficiency and to improve the existing deployed network. In some embodiments the location information may indeed be information relating to the specific geographical location at which the apparatus has been deployed, and thus in some embodiments the apparatus comprises a GPS receiver and the location information for the apparatus provided by the backhaul sub-node to the management node is provided by the GPS receiver.

The present techniques may find applicability in a variety of network contexts, and are not limited to particular communication protocols, but in some embodiments the network environment is a wireless network environment, wherein the backhaul connection is a wireless backhaul connection to the communications network, and wherein the access cell is a wireless access cell to which user equipment can connect.

For example, to give just one contemporary example implementation, the access sub-node may be an LTE small cell eNB, whilst the backhaul, sub-node may be configured to provide integrated LTE backhaul.

In some embodiments in which the backhaul connection is a wireless backhaul connection to the communications network, the backhaul sub-node may be capable of interacting with the network environment in order to determine and optimise its own configuration. The information which the backhaul sub-node thus gains as part of setting itself up may in some embodiments be made use of in providing the network management node with information about the network environment, and this may further influence the particular configuration which the network management node selects for the access sub-node.

In some embodiments the configuration procedure comprises the backhaul sub-node: scanning at least one spectral band for visible backhaul nodes of the wireless network; and forming a connection to a selected backhaul node of the visible backhaul nodes of the wireless network.

In some embodiments transmitting at least a portion of the information about the network environment to the network management node comprises providing the network management node with connection information about the connection to the selected backhaul node. For example, the backhaul sub-node can indicate to the network management node the selected backhaul node to which it has formed this connection. Further information related to the connection may also be provided, such as signal strength and/or signal-to-noise ratio measurements, identity information, and so on. In examples in which the backhaul sub-node has scanned for visible backhaul nodes of the wireless network, the backhaul sub-node may provide information related to the observed backhaul nodes to the network management node. For example, in some embodiments the configuration procedure further comprises the backhaul sub-node providing the network management node with location information for the apparatus, wherein the location information comprises an indication of the visible backhaul nodes, and with identity information. For example (in an LTE example) this identity information may comprise one or more of: RTD (Round- Trip-Delay), EARFCN (E-UTRA Absolute Radio-Frequency Channel Number), Cell identity, PLMN (Public Land Mobile Network) ID.

Accordingly, it should be noted that location information which the backhaul sub-node provides to the network management node may (as indicated above) comprise a dedicated location determination such as that provided by a GPS receiver, but also that the backhaul sub-node can provide the network management node with location information in addition to or instead of such GPS information, this being a "network derived" location. For example, note that with reference to a deployment database of existing operating nodes in the network (including backhaul nodes) the network management node can determine the location in which the apparatus has been deployed from the information relating to visible backhaul nodes which the backhaul sub-node can see and, for example, from their respective signal strengths, signal-to-noise values, and so on. Accordingly, it should be noted that a GPS-based location determination is not essential for the apparatus, and indeed the present techniques recognise that this provides further flexibility in the deployment of the apparatus, such that it can nevertheless enable the configuration of the access sub-node to be carried out, even if the GPS information is unavailable, Which could for example occur due to a highly crowded urban environment in which the apparatus is deployed.

The backhaul sub-node may transmit further information to the network management node related to the network environment, in order to enable the network management node to better configure the access sub-node. This further information could take a variety of forms, but in some embodiments transmitting at least a portion of the information about the network environment to the network management node comprises providing the network management node with further information related to the deployment site of the apparatus. For example, the provider of the apparatus may know that different types of access sub-node configuration are appropriate depending on the type of deployment site of the apparatus, for example, whether it is deployed indoors or outdoors, and for example whether it is deployed at a minimum distance from a building (e.g., when mounted on another item of street furniture) or whether the apparatus is deployed adjacent to a building wall (e.g. mounted on the wall, or positioned on a window ledge). The network management node can then select a general access sub-node configuration appropriate to this deployment site and may further configure the access sub-node configuration as necessary, In some embodiments the access sub-node comprises more than one antenna system for provision of the wireless access cell to which user equipment can connect, and wherein the access sub-node configuration comprises selective antenna enablement of the more than one antenna system. In other words, the access sub-node configuration provided by the network management node determines which of the antenna systems is enabled. For example, it may be recognised that in the particular deployment of the apparatus, that whilst having one antenna system active will benefit the network provision, in fact having another antenna system active may not be worthwhile (for example because it would cause too great an interference with the existing sectors of the network provided) and in such a situation that antenna system can be configured to be switched off. As just one specific example of this, in an apparatus which is designed to be positioned at the periphery of a building (e.g. on a windowsill) and to provide one sector extending into the "outdoor" region outside the building and to provide another "indoor" sector extending into the building, it may be determined that operating the antenna system to provide the outdoor sector would be detrimental or at least not worthwhile and in this situation this antenna system may be switched off, configuring the access sub-node only to provide the "indoor" sector via the other antenna system.

Particular embodiments will now be described with reference to the Figures.

FIG. 1 schematically illustrates an apparatus 10 as used in the described embodiments. This apparatus may also be referred to herein as a combined access and backhaul unit. The apparatus 10 shown in FIG. 1 comprises two distinct sub-node systems, namely the backhaul sub-node 12 and the access sub-node 14. To give useful context to the items shown in FIG. 1, one of ordinary skill in the art will recognise terminology appropriate to the LTE telecommunications standard, with the access sub-node 14 also be labelled "eNB" (eNodeB). The items of user equipment 16 and 18 can connect to the access sub-node 14 by virtue of the access cell which it provides. In some examples the access sub-node may only have a single antenna system and provide one sector of the access cell to which the user equipment can connect. However in the example shown in FIG. 1 the access sub-node 14 comprises two antenna systems which have different orientations (essentially being back-to-back) and this results in the two generated sectors 26 and 28 as shown. The user equipment 18 is illustrated as currently being within the sector 28 generated by the access sub-node 14 and thereby can communicate with the access sub-node in its role as an eNB. The modulation scheme used for this communication link can vary depending on the communication protocol or standard being used and the particular network requirements, but as labelled this may for example be a 16 QAM link. Similarly the user equipment 16 can form a communication link to the access sub-node 14 in a similar manner, where it is currently within the sector 26 also generated by the access sub-node. Note however that the user equipment 16 is also shown as being able to form a direct communications link to the further eNodeB 20 shown in the figure. In the example shown this communications link is mediated by a QPSK link, which reflects the fact that there is a greater distance between the user equipment 16 and the eNB 20 by comparison to the distance to the apparatus 10 and the relatively much smaller size of the antenna which is typically provided in user equipment. For this reason, the apparatus 10 provides the backhaul sub-node (relay) 12, connected to the access sub-node 14 via which the connection of the user equipment to the communications network can also be mediated. Further, where the apparatus 10 is a stationary item of hardware intended to be permanently deployed in a given location, the significantly more powerful antenna system with which the backhaul sub-node 12 can be provided enables a higher order connection to the eNodeB 20 (64 QAM in the example shown). For this reason, despite the connection from the user equipment 16 being mediated via two steps to the eNB 20 when passing via the apparatus 10, the greater capacity Which the respective links of this communication path are able to handle makes this worthwhile. FIG. 1 also shows that further eNodeB devices such as 22 form part of the network. The eNodeBs 20 and 22 are connected to the EPC communications network 24. Typically there will be many eNodeBs deployed within a network such as this and only two are shown in FIG. 1 for brevity and clarity. FIG. 1 is provided to give an example of context for the present techniques, which are particularly concerned with the configuration of the access sub-node 14, for example when the apparatus 10 is first deployed, and thus further detail of the manner in which the wider network operates, with which one of ordinary skill in the art will be familiar, are not repeated here.

Figure 2:
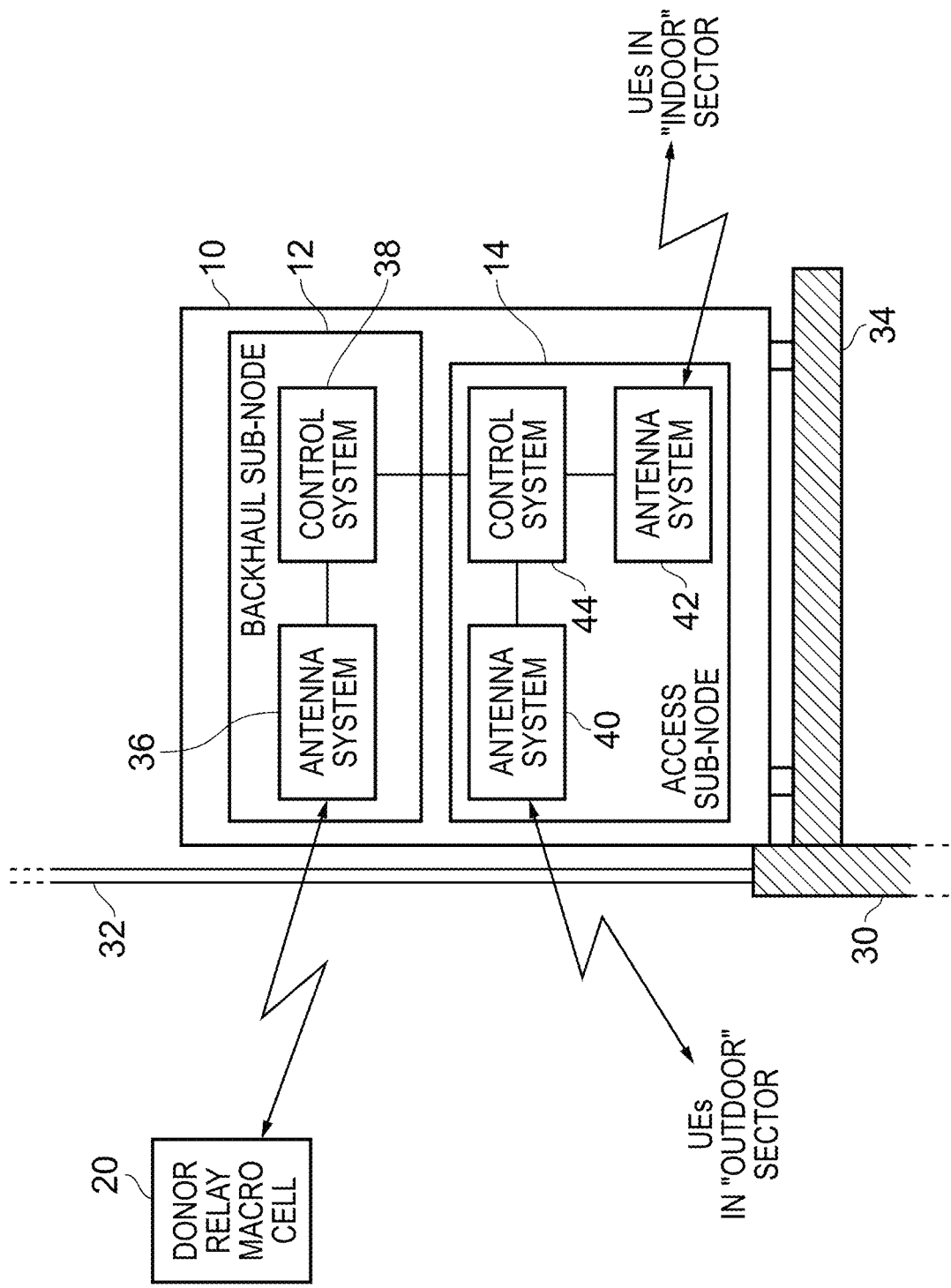
FIG. 2 is a block diagram schematically illustrating an apparatus in accordance with one embodiment.

FIG. 2 schematically illustrates the apparatus 10 in an example deployment. Here, the apparatus 10 is positioned adjacent to the periphery 30, 32 of a building. In this particular example, it is located on a windowsill 34 adjacent to a window 32 at the periphery of the building. The apparatus 10 has three distinct antenna systems, one of which forms part of the backhaul sub-node 12, whilst two form part of the access sub-node 14. The antenna system 42 is used to provide a first "indoor" sector of the network that extends into the building so as to provide enhanced availability of the network to items of user equipment within the building. To access the network for any items of user equipment that connect via the antenna system 42, it is necessary to connect the apparatus 10 into the further network. This is achieved through the use of the antenna system 36, which is arranged to establish a backhaul link with a base station of the network. Such a base station will typically be provided externally to the building and so the antenna system 36 is arranged to generate at least one beam pattern that propagates through the window 32 to establish a wireless backhaul link with the base station 20 to which it connects. The base station 20 is also referred to in FIG. 2 as a donor relay macro cell.

Modern telecommunications standards, such as the LTE standard, allow for high-speed wireless communication with items of user equipment. However, the signals propagated from the base stations typically do not have good indoor penetration. By placing the apparatus 10 at a periphery of a building, a good quality link can typically be established via the antenna system 36 to a base station of the network, with the use of the antenna system 42 allowing a first section of coverage that extends into the building to provide enhanced availability of the network inside the building.

However, in addition, in urban environments it is also often the case that items of user equipment in the open environment, for example, belonging to users moving around at street level between buildings, can experience poor connectivity. For example, pockets of poor network coverage may develop due to shadowing from the buildings and the like, and even in areas where there is network coverage the link quality established with the base station may be relatively poor. This can result not only in a reduced quality of service observed by certain users, but can also degrade the overall spectral efficiency of the network due to the less efficient utilisation of the available network spectrum that can result from the use of such poor quality links.

In this context, the apparatus 10 provides an additional antenna system within the access sub-node 14, namely the antenna system 40, which provides a second "outdoor" sector of the network, the antenna system 40 generating at least one beam pattern that propagates through the periphery 30, 32 of the building to facilitate communication with at least one item of user equipment external to the building. Hence, through the use of the antenna system 40, the apparatus 10 can re-radiate network coverage externally to the building, such that items of user equipment external to the building and falling within the coverage area of the "outdoor" sector are now provided with a further connections option for connecting into the network.

Whether users connect to the apparatus 10 via the antenna system 40 or the antenna system 42, the link to the network is provided via the control system 44 which controls the operation of the access sub-node 14 (including its two antenna systems) and via the control system 38 which controls the operation of the backhaul sub-node 12 including its antenna system. The antenna system 36 thus provides a common wireless backhaul link into the communications network. By this approach, it is possible to establish good quality links with items of user equipment in both the "outdoor" sector and the "indoor" sector. In combination with a good quality backhaul link provided by the antenna system 36, and recalling that this apparatus 10 is a stationary item of hardware such that the antenna system 36 can be relatively large and powerful (in particular when compared to an item of user equipment), this can result in the items of user equipment connected via the apparatus 10 being provided with higher quality links into the network, allowing for more efficient use of the available network spectrum when compared with a situation where those items of user equipment would instead establish a direct connection to the macro base station of the network. As a result the overall spectral efficiency of the network can be increased. It should be noted that each of the antenna systems 36, 40, 42 will include not only an array of antenna elements used to transmit and receive the RF signals, but also the associated RF stage circuit elements that process the transmitted and received RF signals. Additionally each of the antenna systems will have an associated base band stage (i.e. digital signal processing stage) circuits for processing the transmitted signals prior to them being converted into RF signals and to process received signals after they have been converted from RF signals into baseband signals. These baseband stage circuits can be considered to be provided as part of the antenna system blocks 36, 40, 42 or may be considered to be part of the respective associated control systems 38, 44 that control the operation of the various antenna systems and interactions between them.

It should be noted that FIG. 2 is not intended to illustrate how the various components are physically laid out within the apparatus 10, but instead is merely a schematic illustration of the different antenna systems and associated control systems. For example, whilst the antenna system 36 is above the antenna system 40 in the figure, in some embodiments these antenna systems are physically side-by-side.

Figure 3:
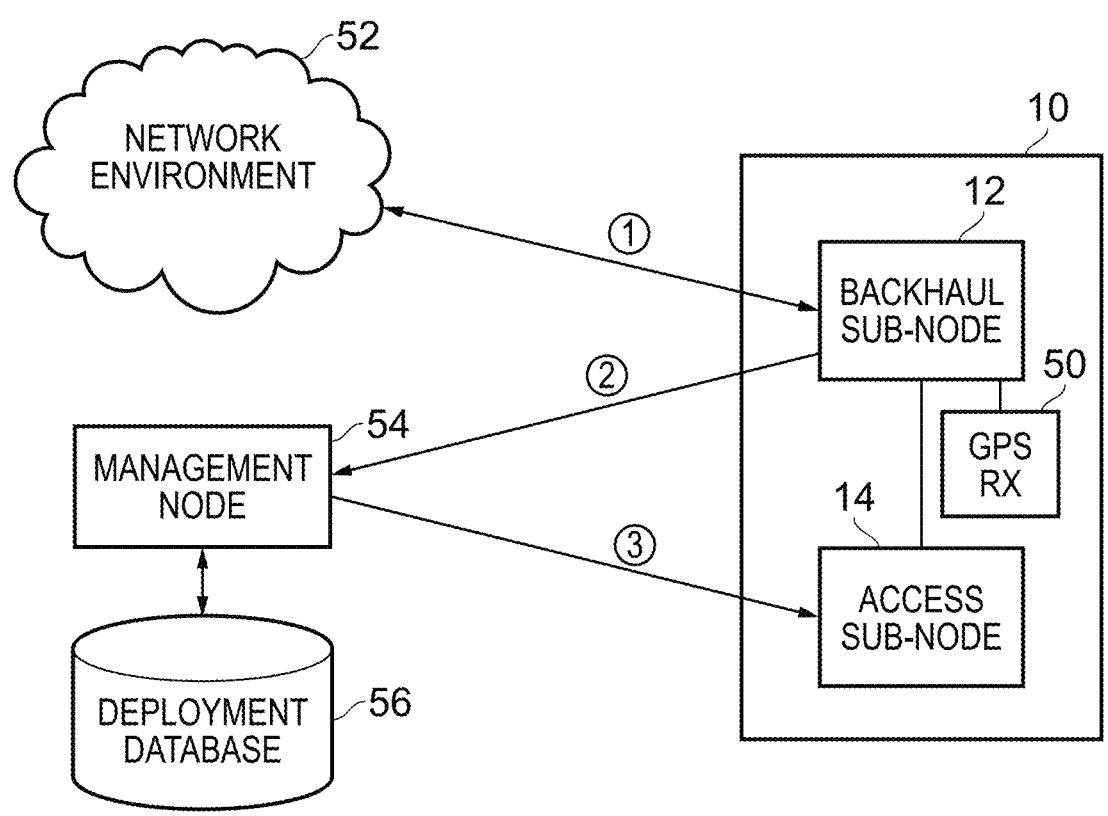
FIG. 3 illustrates how the apparatus of some embodiments connects to the network environment in order to initiate a configuration for its access sub-node.

FIG. 3 schematically illustrates the apparatus 10 in an example deployment and a configuration process by means of which the access sub-node 14 of the apparatus 10 is configured. As shown by the numbered arrows in FIG. 3, the configuration process begins by the backhaul sub-node connecting to the "network environment" 52. In this example, where the terminology of an LTE network is continued, the backhaul sub-node 12 connects as an LTE user equipment (UE) device. It should be understood that this connection to the "network environment" will specifically comprise the backhaul sub-node (as an LTE UE device) connecting to a donor eNodeB (DeNB) such as item 20 shown in FIG. 2. However, the illustration of the network environment 52 in FIG. 3 is intended to communicate that the backhaul sub-node 12 can in principle interact with many different visible macro base stations on the network, for example, by initially scanning the appropriate bands to determine which macro base stations are visible in the vicinity, before establishing a communication link with one of them. Further, the illustration of the network environment 52 in FIG. 3 is intended to communicate that via this link the backhaul sub-node 12 is then connected to the wider network and a communication link (mediated by a selected macro base station) can then be established with any node in the system for the exchange of information). FIG. 3 illustrates such a further node, namely the management node 54.

This management node 54 is provided to enable a deployment of the apparatus 10 which enables efficient usage to be made of the access sub-node 14 and thus that the overall spectral efficiency of the network is maintained. The management node 54 has an overview of the network, and in particular the nodes already deployed in the vicinity of the apparatus 10, which enables it to adapt the configuration to be provided to the access sub-node 14 for this purpose. One source of information to which the management node 54 has access is the deployment database 56, which records where nodes of the network (including items of hardware such as the apparatus 10) have been deployed and the respective roles that they are playing in the operation of the network. The management node 54, in generating a bespoke configuration for the access sub-node 14, also benefits from information which it receives from the backhaul sub-node 12. Given the more powerful antenna system 36 which forms part of the backhaul sub-node 12 (by comparison to either of the antenna systems 40, 42 of the access sub-node 14) the backhaul sub-node 12 is better able to gather information about the environment in which the apparatus 10 has been deployed, in particular other visible nodes of the network which need to be taken into account when configuring the access sub-node 14.

As shown in FIG. 3 therefore after the initial step "1" in which the backhaul sub-node connects to the network environment 52, it then transmits (step "2") at least some of this gathered information about the environment to the management node 54. Note that FIG. 3 also illustrates a specific item of information which the backhaul sub-node 12 can transmit to the management node 54, namely an accurate indication of the geographical position at which the apparatus 10 has been deployed by means of the GPS receiver 50 which forms part of the apparatus 10. The management node 54 then combines the information which it has received from the backhaul sub-node 12 with other information to which it has access, such as from the deployment database 56, and generates a bespoke configuration for the access sub-node 14. The management node 54 then transmits this configuration (step "3") to the apparatus 10. It will be understood by comparison with FIGS. 1 and 2 that the arrow leading from management node 54 to the access sub-node 14 does not represent a direct communications path but rather where the management node 54 is part of the existing network, communications from the management node 54 are mediated by the backhaul link which the backhaul sub-node 12 has established with a local macro base station and from the backhaul sub-node 12 is communicated to the access sub-node 14. Thus, configured, the deployed apparatus 10 is then ready for operation, where the automated configuration process provided means that little, if any, technical input is required for the deployment of the apparatus 10. This means that the apparatus 10 can for example be provided to end users (as opposed to technicians) to install, say placed on a windowsill as in the example of FIG. 2, and the automated "plug-and-play" configuration process for the device provided means that the end user needs to do little more than to switch the apparatus on.

Figure 4:
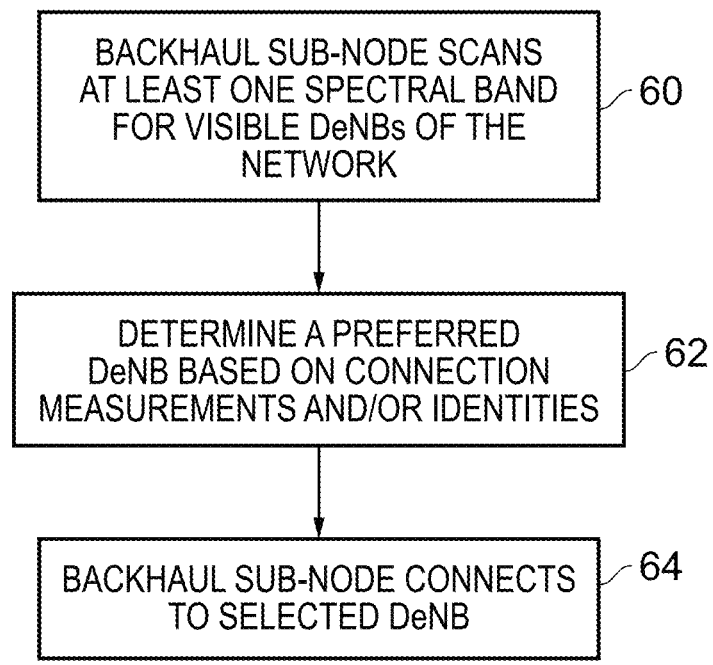
FIG. 4 shows a sequence of steps carried out in the apparatus of some embodiments when connecting to the network environment.

FIG. 4 shows a sequence of steps which are taken in one embodiment when an apparatus (e.g. apparatus 10 in FIGS. 1-3) is deployed. FIG. 4 represents an initial set of steps according to which the backhaul sub-node 12 assesses the network environment in which it finds itself and forms a connection into the wider network. Firstly, at step 60, the backhaul sub-node 12 scans at least one spectral band for visible donor eNodeBs which are "visible", i.e. from which the antenna system of the backhaul sub-node 12 receives a signal in that at least one spectral band when in a receiver mode. Then at step 62 the backhaul sub-node 12 determines a preferred eNodeB from the visible donor eNodeBs (where this decision can be based on various connection measurements and/or identities), and then at step 64 the backhaul sub-node connects to the selected donor eNodeB (macro base station).

Figure 5:
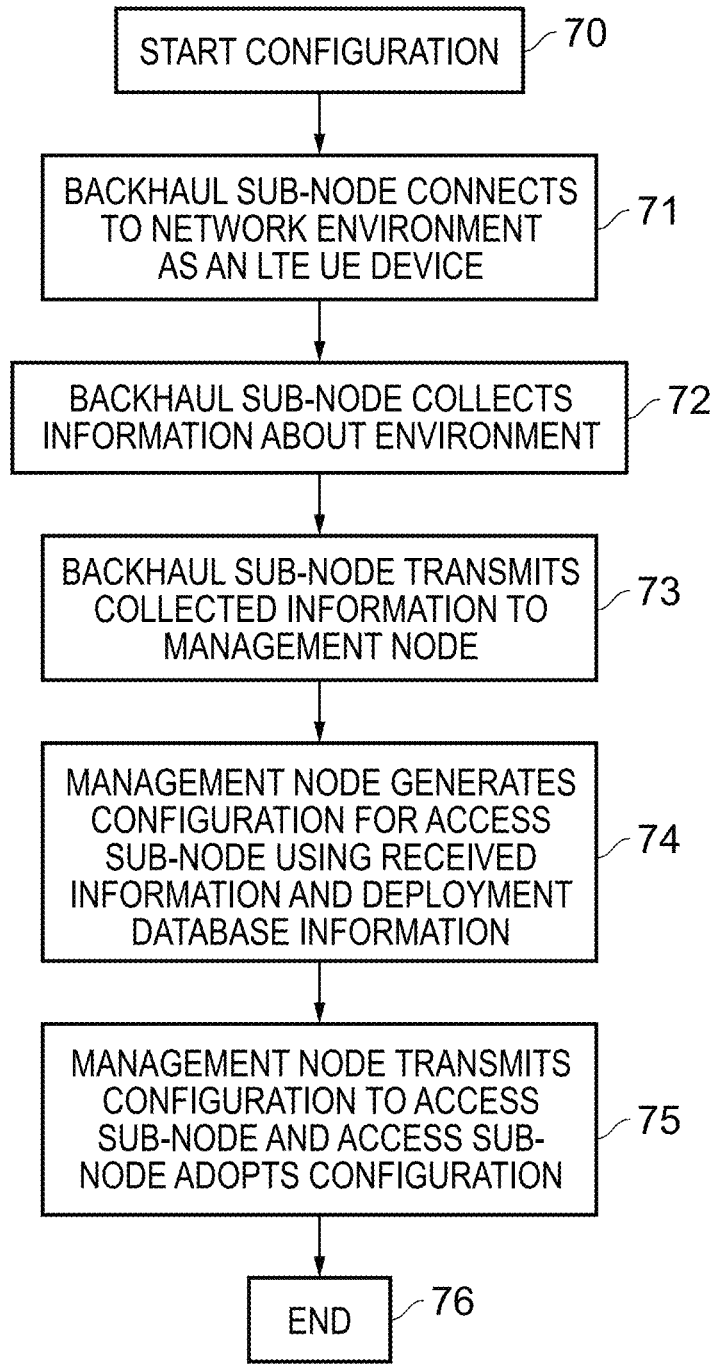
FIG. 5 shows a sequence of steps which are taken when carrying out the method of some embodiments in order to configure the access sub-node of the apparatus.

Next, FIG. 5 shows a sequence of steps which more generally describe the process by which the apparatus 10 is configured on deployment, and in particular to configure the access sub-node 14. The configuration process begins at step 70 in response to a configuration trigger. This configuration trigger may take a variety of forms, depending on when this current configuration process is required to be carried out, but in a typical implementation the configuration process will be carried out when the apparatus 10 is newly deployed and switched on for the first time. Accordingly, the start-up process of the device can be configured to provide this configuration trigger to start the configuration procedure. At step 71 the backhaul sub-node connects to the network environment as an LTE UE device, where reference is made to the example deployment of the apparatus 10 in the LTE environment discussed with reference to FIG. 1. Then at step 72 the backhaul sub-node collects information about the environment in which the apparatus 10 has been deployed. Step 71 may be carried out as described above with reference to FIG. 4, and the information gathered about the visible DeNBs of the network can provide one set of information about the environment in which the apparatus has been deployed. Further, the backhaul sub-mode receives a signal from the GPS receiver 50, giving an indication of the geographical location of the deployment. Other information about the deployment may also be collected by backhaul sub-node, which may include a limited degree of user interaction, for example to allow the user to indicate the type of deployment environment, e.g. on a windowsill, or mounted in another configuration. The information gathered by the backhaul sub-node is then transmitted at step 73 to the management node 54 in the network. It should be noted that there may in fact be more than one management node 54 provided in the network and part of the initial connection (and configuration) of the backhaul sub-node to the network environment 52 may comprise selecting a management node to connect to. At step 74 the management node generates a configuration for the access sub-node 14 using the received information and by accessing its deployment database 56 for information relating to the deployment of the apparatus 10 on the basis of the information provided. For example, having received an indication of the geographical location at which the apparatus 10 has been deployed (by means of the GPS data) the management node 54 can determine from the deployment database 56 what other nodes of the network are currently deployed in the vicinity of the apparatus 10, and modify the configuration of the access sub-node 14 accordingly, so that the access sub-node 14 does not negatively interfere with the existing network coverage provided. At step 75 the management node transmits the configuration to the access sub-node 14 (again recalling that this is via the backhaul connection provided by the backhaul sub-node 12) and the access sub-node then adopts the provided configuration and then the full apparatus 10 may then begin operation. The flow ends at step 76.

Figure 6:
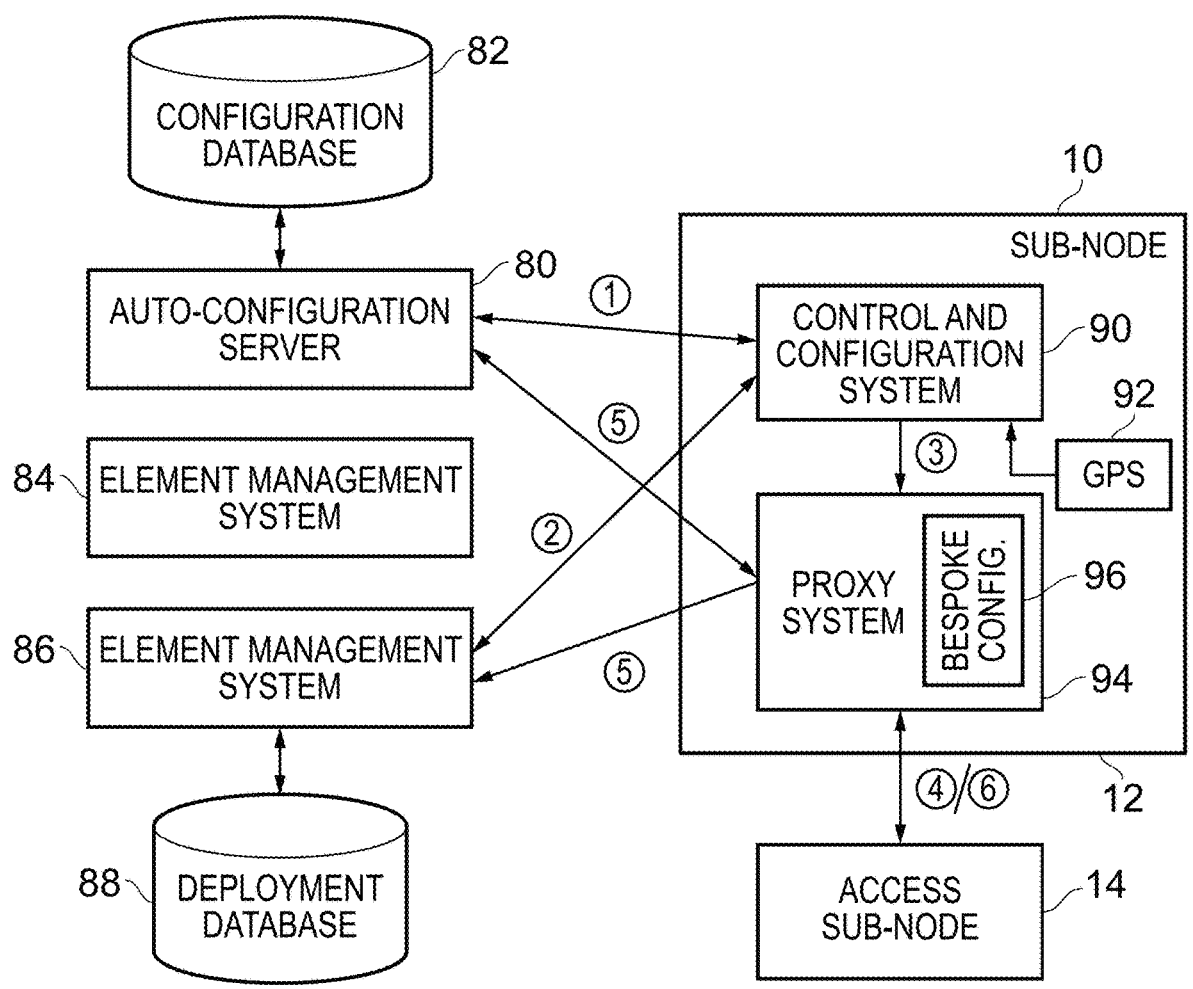
FIG. 6 is a block diagram schematically illustrating an apparatus in accordance with some embodiments and some further network components with which it interacts, wherein a proxy system in the apparatus is arranged to intercept configuration requests received from the access sub-node of the apparatus.

FIG. 6 schematically illustrates the apparatus 10 in an example deployment and a configuration process by means of which the access sub-node 14 of the apparatus 10 is configured. The configuration process begins by the backhaul sub-node 12 determining its own configuration information. This may be derived from multiple sources, such as information relating to the location of the apparatus, an auto-configuration server in the network, an element management system, and potentially from other systems in the network as well. As shown in the figure, in a first step ("1") in this example the control and configuration system 90 of the backhaul sub-node 12 contacts the auto-configuration server 80 in the network. This provides a standard auto-configuration set of deployment parameters to the backhaul sub-node. These may be retrieved from a configuration database 82. The backhaul sub-node may modify these default parameters in dependence on the particular deployment of the apparatus 10 and depending on other knowledge which it has of its environment. In a next step ("2") the control and configuration system 90 of the backhaul sub-node 12 contacts an element management system 86 in the network. This may involve registering with the element management system (as a newly deployed node) and also receiving information about other deployed nodes in the vicinity. Note that as shown in FIG. 6 more than one element management system 84, 86 may be present in the network, and the backhaul sub-node may choose a specific element management system to register with, for example based on its location. Next the control and configuration system 90 of the backhaul sub-node 12 configures the proxy system 94 with information that has been obtained during its own configuration procedure. This information thus represents bespoke configuration data 96, which is then held in the proxy system 94 for the access sub-node 14. This information is then used to modify messages from the auto-configuration server 80 which are directed to the access sub-node 14. For example the auto-configuration server may provide the address of a default element management server 84 to contact, and this may be modified to provide the address of the element management server 86, which the backhaul sub-node has selected in its own configuration procedure.

Subsequently, when the access sub-node attempts to configure itself by contacting the auto-configuration server—in accordance with the usual plug-and-play set-up procedure, the request (step "4") is intercepted by the backhaul sub-node, and a response is provided by the proxy system 94 instead. If required the proxy system may (step "5") issue a request to the auto-configuration server on behalf of the access sub-node, or if it has sufficient information locally available (e.g. that it has derived as part of its own configuration procedure) then it may directly respond to the access sub-node. Either way, the default configuration that would have been received from the auto-configuration server (in the absence of the proxy system) is modified, and the access sub-node receives (step "6") a response which appears to have come from the auto-configuration server. The access sub-node then configures itself in accordance with the information which it has received.

Note also that the protocol which is used to supply the auto-configuration information is not relevant to this procedure. It may be a standard protocol (such as DHCP) or it may be any other protocol used for this purpose. The access sub-node is not aware of the role played by the backhaul sub-node, which means that it may be deployed using many different backhaul technologies. However, when it is used with a backhaul sub node which supports the auto-configuration proxy, then additional information is included which may optimise the configuration of the access sub-node.

Figure 7:
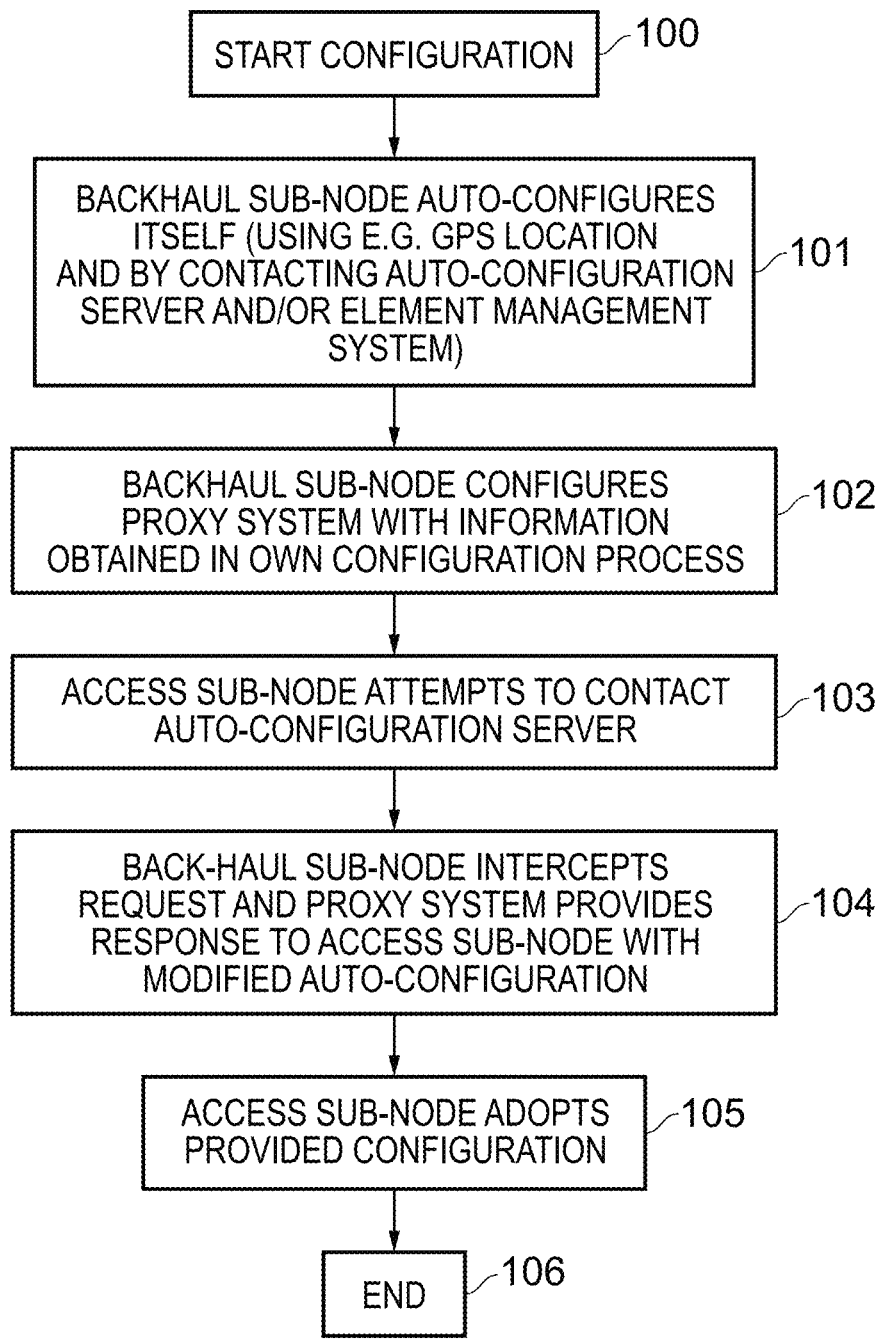
FIG. 7 shows a sequence of steps which are taken in the method of some embodiments in order to configure the access sub-node.

FIG. 7 shows a sequence of steps which are carried out to configure the apparatus 10 on deployment. The configuration process begins at step 100 in response to a configuration trigger. This configuration trigger may take a variety of forms, depending on when this current configuration process is required to be carried out, but in a typical implementation the configuration process will be carried out when the apparatus 10 is newly deployed and switched on for the first time. Accordingly, the start-up process of the device can be configured to provide this configuration trigger to start the configuration procedure. At step 101 the backhaul sub-node performs its own auto-configuration process. As described above, this may involve local information (for example from its own GPS receiver) and may involve the backhaul sub-node contacting an auto-configuration server in the network, an element management system, and potentially from other systems in the network as well. Then at step 102 the backhaul sub-node configures the proxy system with the information that has been obtained during its own configuration procedure. Next, at step 103, the access sub-node attempts to configure itself by contacting the auto-configuration server. The backhaul sub-node intercepts (step 104) this communication (specifically it identifies a request destined for the auto-configuration server from the access sub-node and handles this request itself, rather than passing it on) and it provides a response, in the format which the access sub-node is expecting from the auto-configuration server, but in which the default configuration which would have been received from the auto-configuration server (in the absence of the proxy system) is modified. At step 105 the access sub-node configures itself in accordance with the information which it has received and the steps conclude at step 105.

In brief overall summary, an apparatus, method of operating the apparatus, and system comprising the apparatus are provided. The apparatus has a backhaul sub-node to provide a backhaul connection to a communications network and an access sub-node to provide an access cell to which user equipment can connect. In response to a configuration trigger a configuration procedure is performed, in which the backhaul sub-node gathers information about the network environment and transmits at least a portion of the information about the network environment to a network management node. The network management node then generates an access sub-node configuration which it transmits to the access sub-node, where the configuration is dependent on the information about the network environment transmitted to the network management node by the backhaul sub-node. The backhaul sub-node's greater ability to gather information about the network environment thus supports an improved configuration for the access sub-node, without technical input from the user being required.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device in the apparatus may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. An apparatus comprising:
   a backhaul sub-node, including a backhaul sub-node antenna system and a control system, to provide a backhaul connection to a communications network; and
   an access sub-node, including an access sub-node antenna system and a control system, to provide an access cell to which a backhaul sub-node antenna system user equipment can connect,
   the control system of the backhaul sub-node using the backhaul sub-node antenna system to gather information about the network environment and transmitting at least a portion of the information about the network environment to a network management node, in a configuration procedure responsive to a configuration trigger,
   and the control system of the access sub-node receiving an access sub-node configuration from the network management node, wherein the configuration is dependent on the at least a portion of the information about the network environment transmitted to the network management node in the configuration procedure.

2. The apparatus as claimed in claim 1, wherein the configuration procedure comprises the backhaul sub-node providing the network management node with location information for the apparatus.

3. The apparatus as claimed in claim 2, wherein the apparatus comprises a GPS receiver and the location information for the apparatus provided by the backhaul sub-node to the management node is provided by the GPS receiver.

4. The apparatus as claimed in claim 1, wherein the network environment is a wireless network environment, wherein the backhaul connection is a wireless backhaul connection to the communications network, and wherein the access cell is a wireless access cell to which user equipment can connect.

5. The apparatus as claimed in claim 4, wherein the configuration procedure comprises the backhaul sub-node:
   scanning at least one spectral band for visible backhaul nodes of the wireless network; and
   forming a connection to a selected backhaul node of the visible backhaul nodes of the wireless network.

6. The apparatus as claimed in claim 1, wherein transmitting at least a portion of the information about the network environment to the network management node comprises providing the network management node with connection information about the connection to the selected backhaul node.

7. The apparatus as claimed in claim 4, wherein the configuration procedure further comprises the backhaul sub-node providing the network management node with location information for the apparatus, wherein the location information comprises an indication of the visible backhaul nodes, and with identity information.

8. The apparatus as claimed in claim 2, wherein transmitting at least a portion of the information about the network environment to the network management node comprises providing the network management node with further information related to the deployment site of the apparatus.

9. The apparatus as claimed in claim 4, wherein the access sub-node comprises more than one access sub-node antenna system for provision of the wireless access cell to which user equipment can connect, and wherein the access sub-node configuration comprises selective antenna enablement of the more than one access sub-node antenna system.

10. A method of performing a configuration procedure in an apparatus comprising:
    in a backhaul sub-node of the apparatus capable of providing a backhaul connection to a communications network:
       gathering information about the network environment using a backhaul antenna system; and
       transmitting at least a portion of the information about the network environment to a network management node;
    and in an access sub-node of the apparatus capable of providing an access cell using an access sub-node antenna system to which user equipment can connect:
       receiving an access sub-node configuration from the network management node, wherein the configuration is dependent on the at least a portion of the information about the network environment transmitted to the network management node; and
       adopting the access sub-node configuration.

11. The method as claimed in claim 10, wherein the configuration procedure comprises the backhaul sub-node providing the network management node with location information for the apparatus.

12. The method as claimed in claim 10, wherein the apparatus comprises a GPS receiver and the location information for the apparatus provided by the backhaul sub-node to the management node is provided by the GPS receiver.

13. The method as claimed in claim 10, wherein the network environment is a wireless network environment, wherein the backhaul connection is a wireless backhaul connection to the communications network, and wherein the access cell is a wireless access cell to which user equipment can connect.

14. The method as claimed in claim 13, wherein the configuration procedure comprises the backhaul sub-node:
    scanning at least one spectral band for visible backhaul nodes of the wireless network; and
    forming a connection to a selected backhaul node of the visible backhaul nodes of the wireless network.

15. The method as claimed in claim 10, wherein transmitting at least a portion of the information about the wireless network environment to the network management node comprises providing the network management node with connection information about the connection to the selected backhaul node.

16. The method as claimed in claim 14, wherein the configuration procedure further comprises the backhaul sub-node providing the network management node with location information for the apparatus, wherein the location information comprises an indication of the visible backhaul nodes, and with identity information.

17. The method as claimed in claim 11, wherein transmitting at least a portion of the information about the network environment to the network management node comprises providing the network management node with further information related to the deployment site of the apparatus.

18. The method as claimed in claim 10, wherein the access sub-node comprises more than one access sub-node antenna system for provision of the wireless access cell to which user equipment can connect, and wherein and the access sub-node configuration comprises selective antenna enablement of the more than one access sub-node antenna system.

19. A system comprising:
the apparatus as claimed in claim 2;
the network management node; and
a database,
wherein the network management node is responsive to reception of the location information for the apparatus from the backhaul sub-node to retrieve parameters for the access sub-node configuration from the database in dependence on the at least a portion of the information about the network environment transmitted to the network management node.

20. The system as claimed in claim 19, wherein the network management node is configured to generate the access sub-node configuration from the parameters retrieved from the database and at least a portion of the information about the wireless network environment received from the backhaul sub-node.

21. A method of performing a configuration procedure in the system as claimed in claim 19 comprising:
in response to the configuration trigger, in the backhaul sub-node:
gathering information about the network environment; and
transmitting at least a portion of the information about the network environment to the network management node;
in the network management node, in response to reception of the location information for the apparatus from the backhaul sub-node:
retrieving parameters for the access sub-node configuration from the database in dependence on the at least a portion of the information about the network environment transmitted to the network management node; and
transmitting the access sub-node configuration to the access sub-node; and
in the access sub-node:
receiving the access sub-node configuration from the network management node; and
adopting the access sub-node configuration.

22. An apparatus comprising:
means for providing a backhaul connection to a communications network; and
means for providing an access cell to which user equipment can connect, the means for providing the backhaul connection gathering information about the network environment and transmitting at least a portion of the information about the network environment to a means for network management, in a configuration procedure responsive to a configuration trigger,
and the means for providing the access cell receiving a configuration from the means for network management, wherein the configuration is dependent on the at least a portion of the information about the network environment transmitted to the means for network management in the configuration procedure.

* * * * *